United States Patent
Park et al.

(10) Patent No.: US 9,746,702 B2
(45) Date of Patent: Aug. 29, 2017

(54) DISPLAY DEVICE

(71) Applicant: Samsung Display Co., Ltd., Yongin-si, Gyeonggi-Do (KR)

(72) Inventors: Cheuljin Park, Seoul (KR); Hyunchul Bae, Suwon-si (KR); Donghyeon Lee, Seoul (KR); Kwangwook Choi, Osan-si (KR)

(73) Assignee: Samsung Display Co., Ltd., Giheung-Gu, Yongin-si, Gyeonggi-Do (KR)

( * ) Notice: Subject to any disclaimer, the term of this patent is extended or adjusted under 35 U.S.C. 154(b) by 0 days.

(21) Appl. No.: 14/806,250

(22) Filed: Jul. 22, 2015

(65) Prior Publication Data

US 2016/0120045 A1    Apr. 28, 2016

(30) Foreign Application Priority Data

Oct. 23, 2014 (KR) .................. 10-2014-0144388

(51) Int. Cl.
*G06F 1/16* (2006.01)
*G02F 1/1333* (2006.01)

(52) U.S. Cl.
CPC ............. *G02F 1/133308* (2013.01); *G02F 2001/13332* (2013.01); *G02F 2001/133314* (2013.01); *G02F 2201/46* (2013.01)

(58) Field of Classification Search
None
See application file for complete search history.

(56) References Cited

U.S. PATENT DOCUMENTS

| 6,332,690 | B1 * | 12/2001 | Murofushi | G02F 1/133305 349/64 |
| 6,381,164 | B1 * | 4/2002 | Fan | G11O 5/063 257/E23.067 |
| 6,501,642 | B2 * | 12/2002 | Kim | G06F 1/1616 361/679.26 |
| 6,587,166 | B1 * | 7/2003 | Lee | G02F 1/133308 349/149 |
| 6,654,071 | B2 * | 11/2003 | Chen | G06F 3/044 345/104 |
| 7,011,443 | B2 * | 3/2006 | Chen | G02F 1/133615 362/633 |
| 7,116,385 | B2 * | 10/2006 | Yeom | G02F 1/133615 349/58 |

(Continued)

FOREIGN PATENT DOCUMENTS

KR  10-2005-0095922 A  10/2005
KR  10-2009-0103576 A  10/2009

(Continued)

*Primary Examiner* — Courtney Smith
*Assistant Examiner* — Rashen E Morrison
(74) *Attorney, Agent, or Firm* — Robert E. Bushnell, Esq.

(57) ABSTRACT

A display device includes a display panel, a top chassis partially surrounding a top surface of the display panel and having first and second inserting holes, a bottom chassis configured to accommodate the display panel and having third and fourth inserting holes, and at least one fixing member extending through the third inserting hole, the first inserting hole, the second inserting hole and the fourth inserting hole to thereby couple the bottom chassis and the top chassis to each other.

14 Claims, 8 Drawing Sheets

(56) References Cited

U.S. PATENT DOCUMENTS

| | | | | |
|---|---|---|---|---|
| 7,190,424 B2* | 3/2007 | Lee | G02B 6/0083 | 349/58 |
| 7,190,503 B2* | 3/2007 | Ide | G02F 1/1333 | 349/58 |
| 7,609,355 B2* | 10/2009 | Nouchi | G02F 1/1333 | 349/113 |
| 7,623,195 B2* | 11/2009 | Park | G02F 1/133615 | 349/58 |
| 7,651,257 B2* | 1/2010 | Shin | G02F 1/133615 | 349/58 |
| 7,719,628 B2* | 5/2010 | Suh | G02B 6/0088 | 349/122 |
| 7,843,524 B2* | 11/2010 | Lee | G02B 6/009 | 349/58 |
| 7,891,857 B2* | 2/2011 | Lee | G02B 6/0083 | 349/58 |
| 8,125,772 B2* | 2/2012 | Kim | G02F 1/133308 | 343/702 |
| 8,206,023 B2* | 6/2012 | Kang | G02B 6/0071 | 349/58 |
| 8,422,233 B2* | 4/2013 | Li | G06F 1/20 | 257/718 |
| 9,113,553 B2* | 8/2015 | An | H05K 5/0217 | |
| 9,441,404 B2* | 9/2016 | Paquette | E05D 3/022 | |
| 2002/0034064 A1* | 3/2002 | Kim | G06F 1/1616 | 361/679.26 |
| 2003/0058380 A1* | 3/2003 | Kim | G02F 1/133308 | 349/58 |
| 2003/0098940 A1* | 5/2003 | Lee | G02F 1/13452 | 349/149 |
| 2003/0117544 A1* | 6/2003 | Kim | G02F 1/133604 | 349/58 |
| 2003/0223020 A1* | 12/2003 | Lee | G02B 6/0088 | 349/58 |
| 2005/0117197 A1* | 6/2005 | Ide | G02F 1/1333 | 359/291 |
| 2006/0273304 A1* | 12/2006 | Cok | H01L 51/0096 | 257/40 |
| 2007/0146569 A1* | 6/2007 | Nouchi | G02B 6/0088 | 349/58 |
| 2007/0146616 A1* | 6/2007 | Nouchi | G02F 1/1333 | 349/155 |
| 2009/0002601 A1* | 1/2009 | Lee | G02B 6/0031 | 349/65 |
| 2009/0015747 A1* | 1/2009 | Nishizawa | G02F 1/133308 | 349/58 |
| 2009/0091681 A1* | 4/2009 | Nishizawa | G02F 1/133308 | 349/58 |
| 2009/0316062 A1* | 12/2009 | Nishizawa | G02F 1/133305 | 349/58 |
| 2010/0061117 A1* | 3/2010 | Kang | G02B 6/0071 | 362/613 |
| 2010/0195040 A1* | 8/2010 | Koganezawa | G02F 1/1333 | 349/153 |
| 2011/0027036 A1* | 2/2011 | Park | F16B 37/002 | 411/81 |
| 2011/0058349 A1* | 3/2011 | Jang | H05K 5/0017 | 361/829 |
| 2012/0224119 A1* | 9/2012 | Cho | G09F 13/22 | 349/61 |
| 2013/0321740 A1* | 12/2013 | An | H05K 5/0217 | 349/58 |
| 2014/0111736 A1* | 4/2014 | An | G02F 1/133305 | 349/58 |
| 2014/0168564 A1* | 6/2014 | Lee | G02F 1/133615 | 349/58 |
| 2015/0146403 A1* | 5/2015 | Lee | G02F 1/133308 | 361/809 |
| 2015/0226997 A1* | 8/2015 | Tomomasa | G02F 1/133308 | 348/794 |
| 2016/0054613 A1* | 2/2016 | Lee | G02F 1/133308 | 362/97.2 |

FOREIGN PATENT DOCUMENTS

| | | |
|---|---|---|
| KR | 10-2010-0029481 A | 3/2010 |
| KR | 10-2011-0048299 A | 5/2011 |
| KR | 10-2013-0090867 A | 8/2013 |

* cited by examiner

DISPLAY DEVICE

CLAIM OF PRIORITY

This application makes reference to, incorporates the same herein, and claims all benefits accruing under 35 U.S.C. §119 from an application earlier filed in the Korean Intellectual Property Office on 23 Oct. 2014 and there duly assigned Serial No. 10-2014-0144388.

BACKGROUND OF THE INVENTION

Field of the Invention

Embodiments of the present invention relate to a display device improved in coupling force between a top chassis and a bottom chassis.

Description of the Related Art

A liquid crystal display (LCD) is a type of flat panel displays (FPDs), which is most widely used these days. An LCD includes two substrates including electrodes formed thereon and a liquid crystal layer interposed therebetween. Upon applying voltage to two electrodes, liquid crystal molecules of the liquid crystal layer are rearranged, thereby adjusting an amount of transmitted light.

A liquid crystal display (LCD), which is a passive light emitting device, includes a display panel configured to display images, a mold frame on which the display panel is mounted, and a backlight assembly configured to provide light to the display panel. The mold frame may be coupled to the bottom chassis, which forms a framework of the backlight assembly, using a coupling structure such as a hook.

Meanwhile, LCD devices having slimmer structures and lighter weight have been developed to improve product competitiveness. In particular, studies have been conducted to develop an LCD device reduced in overall size by reducing a width of a bezel, that is, a distance between an outer edge of the LCD device and an adjacent side of an active area that actually displays an image. In order to achieve such a narrow bezel, a side wall portion of a bottom chassis has been reduced in thickness. In accordance with the reduced thickness of the side wall portion of the bottom chassis, coupling force of a hook or screw coupling structure between a top chassis and the bottom chassis may be weakened and a hook formed on the bottom chassis or the top chassis may be broken to cause coupling defects. In particular, coupling force between the top chassis and the bottom chassis may be weakened in a z-axis direction (a thickness direction). Further, the top chassis may become loosened off from the bottom chassis between coupling points where the hook or screw is formed.

Accordingly, there is a demand for a coupling structure that can improve coupling force between a top chassis and a bottom chassis.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY OF THE INVENTION

Aspects of embodiments of the present invention are directed to a display device that is improved in coupling force between a top chassis and a bottom chassis and is enhanced in device strength.

According to an exemplary embodiment of the present invention, a display device includes: a display panel; a top chassis configured to partially surround a top surface of the display panel and having first and second inserting holes; a bottom chassis configured to accommodate the display panel and having third and fourth inserting holes; and at least one fixing member extending through the third inserting hole, the first inserting hole, the second inserting hole, and the fourth inserting hole to thereby couple the bottom chassis and the top chassis to each other.

The fixing member may include: a wire; and coupling units disposed at both end portions of the wire and extending through the top chassis and the bottom chassis.

The coupling unit may include: a locking projection disposed at one end portion of the wire and locked to one of the bottom chassis and the top chassis; and a bolt unit extending from another end portion of the wire and having a screw groove.

The coupling unit may further include a nut unit engaged with the bolt unit.

A guide groove may be formed on a surface of at least one of the top chassis and the bottom chassis. The wire may be disposed in the guide groove.

A mounting groove may be formed on a surface of at least another of the top chassis and the bottom chassis. One of the coupling units may be disposed in the mounting groove.

The bottom chassis may have a bottom portion and a side wall portion bent from the bottom portion, The side wall portion may have the third inserting hole and the fourth inserting hole.

The display device may further include a mold frame coupled to the bottom chassis.

The mold frame may include a support on which the display panel is disposed. The support may have fifth and sixth inserting holes.

The fixing member may extend through the third inserting hole, the fifth inserting hole, the first inserting hole, the second inserting hole, the sixth inserting hole, and the fourth inserting hole to thereby couple the bottom chassis, the top chassis, and the mold frame together.

According to embodiments of the present invention, a display device may prevent loosening of a top chassis, improve coupling force between a top chassis and a bottom chassis in a z-axis direction, minimize assembly allowance, and remove unnecessary structure of hook or screw coupling, thereby improved in intrinsic strength of the top chassis and the bottom chassis.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, a display device according to an exemplary embodiment will be described in detail with reference to FIGS. 1 and 2.

Figure 1:
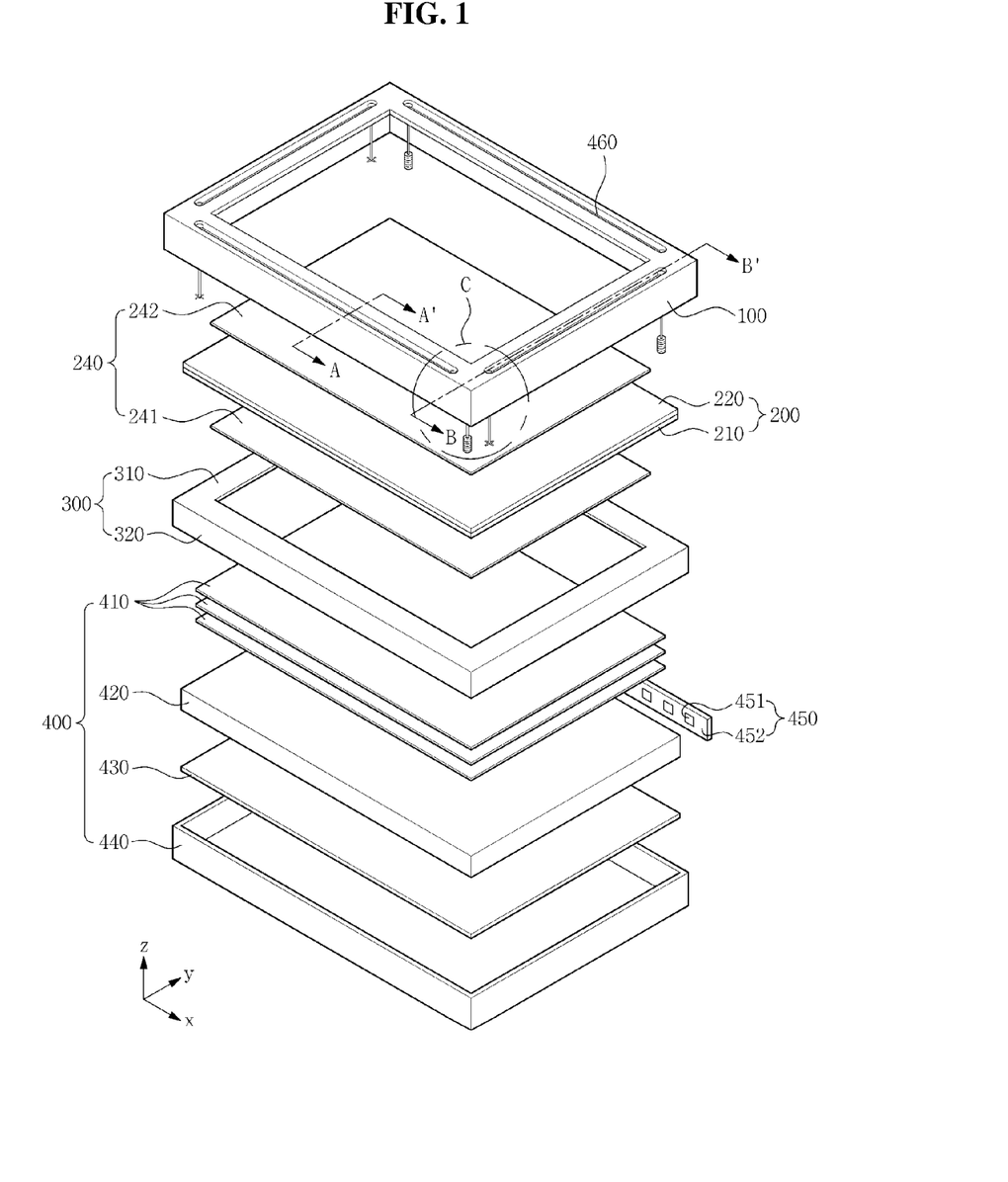
FIG. 1 is a schematic exploded perspective view illustrating a display device according to an exemplary embodiment.

FIG. 1 is an exploded perspective view illustrating a display device according to an exemplary embodiment. FIG. 2 is a cross-sectional view taken along line A-A' of FIG. 1.

Figure 2:
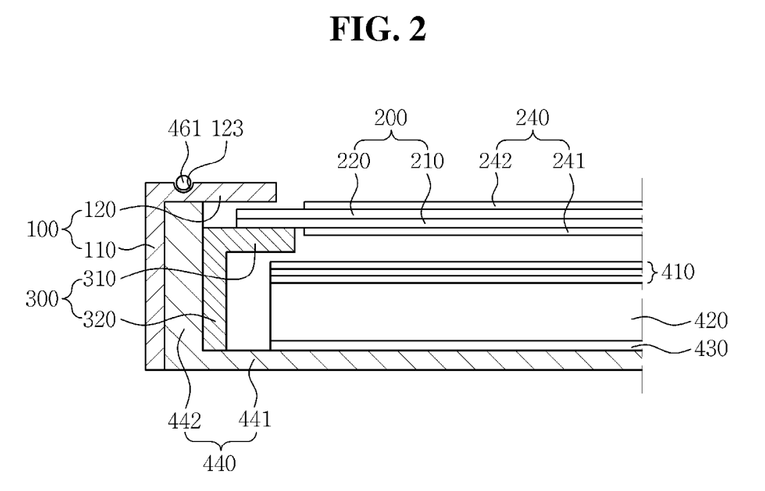
FIG. 2 is a cross-sectional view taken along line A-A' of FIG. 1.

Referring to FIGS. 1 and 2, the display device may include a display panel 200 configured to display images, a backlight assembly 400 configured to supply light to the display panel 200, a top chassis 100 provided in a form of surrounding the display panel 200, and a mold frame 300 on which the display panel 200 is mounted.

The top chassis 100 may be coupled to a bottom chassis 440 to thereby cover an edge portion of the display panel 200 mounted on the mold frame 300. The edge portion of the display panel 200 covered by the top chassis 100 is a non-display area in which images are not displayed. The top chassis 100 may have an opening at the center portion and the display panel 200 may be exposed through the opening. A coupling structure of the top chassis 100 and the bottom chassis 440 will be described below.

The display panel 200 is configured to display images. The display panel 200 may be a light-receiving type display panel and may be categorized into an LCD panel, an electrowetting display panel, an electrophoretic display panel, a microelectromechanical system (MEMS) display panel, and the like. It is assumed that the LCD panel is used as an exemplary embodiment of the present invention for the purpose of descriptions, but other types of display devices can be used.

The display panel 200 may be provided in a quadrilateral panel form having two pairs of parallel sides. According to an exemplary embodiment, the display panel 200 may have a rectangular form having a pair of long sides and a pair of short sides. The display panel 200 may include a first substrate 210, a second substrate 220 facing the first substrate 210, and a liquid crystal layer (not illustrated) interposed between the first and second substrates 210 and 220. The display panel 200, when viewed in a plane, may have a display area that displays an image and a non-display area that surrounds the display area and does not display an image. The non-display area may be covered by the top chassis 100.

The first substrate 210 may include a plurality of pixel electrodes (not illustrated) and a plurality of thin film transistors (TFTs) (not illustrated) electrically connected to the pixel electrodes in one-to-one correspondence. A data line may be connected to a source electrode of the TFT, a gate line may be connected to a gate electrode thereof, and a pixel electrode may be connected to a drain electrode thereof. Each TFT may function as a switch for a driving signal supplied to the corresponding pixel electrode. Further, the second substrate 220 may include a common electrode (not illustrated) forming an electric field that controls arrangement of the liquid crystals along with the pixel electrodes. The display panel 200 may be configured to drive the liquid crystal layer to display an image frontwards.

The display panel 200 may include: a driving chip (not illustrated) configured to apply a driving signal; a driving-chip mounting film (not illustrated) on which the driving chip is mounted; and a printed circuit board (PCB, not illustrated) electrically connected to the display panel 200 through the driving-chip mounting. The driving-chip mounting film may be a tape carrier package (TCP).

The driving-chip mounting film and the PCB may be bent from one end portion of the display panel 200 and disposed on a side surface of the mold frame 300.

The driving chip may generate a driving signal for driving the display panel 200 in response to an external signal. The external signal may be supplied from the PCB and may include image signals, various control signals, and a driving voltage.

For instance, the gate PCB may be connected to the gate driving-chip mounting film. The gate PCB may supply an image signal to the gate driving chip. The data PCB may be connected to the data driving-chip mounting film. The data PCB may supply an image signal to the data driving chip.

The gate driving chip may receive the image signal and supply a gate driving signal to the gate line. The data driving chip may receive the image signal and supply a data driving signal to the data line.

Polarizers 240 may be disposed on the display panel 200 and include first and second polarizers 241 and 242. The first and second polarizers 241 and 242 may be respectively disposed on the opposite sides of facing surfaces of the first and second substrates 210 and 220. That is, the first polarizer 241 may be attached on an outer surface of the first substrate 210, and the second polarizer 242 may be attached on an outer surface of the second substrate 220. A transmissive axis of the first polarizer 241 may be substantially at right angles to a transmissive axis of the second polarizer 242.

The mold frame 300 may be coupled to the bottom chassis 440 and accommodate the display panel 200. The mold frame 300 may include a support 310 on which the display panel 200 is disposed and a protrusion 320 bent from the support 310. The mold frame 300 may include a flexible material such as plastics so as to prevent damage on the display panel 200.

The mold frame 300 may be provided along the edge portion of the display panel 200 and support the display panel 200 from the bottom of the display panel 200. The mold frame 300 may be provided in areas corresponding to four sides or at least a part of the four sides of the display panel 200. For example, the mold frame 300 may have a quadrilateral-loop form corresponding to the four sides of the display panel 200, or may have a C-shape, that is, a quadrilateral open-loop form corresponding to three sides of the edge portion of the display panel 200.

The backlight assembly 400 may include an optical sheet 410, a light guide plate 420, a reflective sheet 430, the bottom chassis 440, a light source unit 450, and a fixing member 460.

The light source unit 450 may include a light source 451 and a circuit board 452 on which the light source 451 is disposed. The light source unit 450 may be disposed at a corner portion or on a light incident side portion of the light guide plate 420. In other words, the light source unit 450 may emit light from the corner portion or the light incident side portion of the light guide plate 420.

The light source 451 may include at least one LED chip (not illustrated) and a package (not illustrated) for accommodating the LED chip. The light source 451 may have a light emitting surface in a direction where the light guide plate 420 is disposed.

The circuit board 452 may include, for example, a PCB or a metal PCB.

Such a light source unit 450 may be provided on one, two, or four side surfaces of the light guide plate 420, in consideration of size and luminance uniformity of the display panel 200. In some embodiments, the light source unit 450 may be formed on at least one corner portion of the light guide plate 420.

Light emitted from the light source 451 may be incident on a light-incident side surface of the light guide plate 420 and emitted to the light emitting surface thereof. The light guide plate 420 may be configured to uniformly supply light supplied from the light source unit 450 to the display panel 200. The light guide plate 420 may be disposed adjacent to the light source unit 450 and accommodated in the bottom chassis 440. The light guide plate 420 may be provided, for example, in a quadrilateral panel form as the display panel 200, but is not limited thereto. In some embodiments, when an LED is used as the light source 451, the light guide plate 420 may have various forms including a predetermined groove and/or a protrusion according to a position of the light source 451.

Although referred to as a "plate" for the purpose of description, the light guide plate 420 may be in a shape of a sheet or a film so as to achieve slimness of the display device. That is, light guide plate 420 is to be understood as having a concept that includes not only a plate but also a film for guiding light.

The light guide plate 420 may include a light-transmissive material. The light-transmissive material may include an acrylic resin, such as polymethylmethacrylate (PMMA), or polycarbonate (PC) so as to guide light efficiently.

A pattern may be formed on at least one surface of the light guide plate 420. For example, a scattering pattern (not illustrated) may be formed on a lower surface thereof, so as to scatter and/or reflect the guided light upwards.

The optical sheet 410 may be disposed on the light guide plate 420 and configured to diffuse and/or collect light directed from the light guide plate 420. The optical sheets 410 may include a diffusion sheet, a prism sheet, a protective sheet, and other functional sheets.

The diffusion sheet is configured to disperse light incident from the light guide plate 420 to thereby prevent the light from being partly concentrated.

The prism sheet may include prisms having a triangular cross-section and formed in a predetermined array on one surface thereof. The prism sheet may be disposed on the diffusion sheet and may collect light diffused from the diffusion sheet in a direction perpendicular to the display panel 200.

The protective sheet may be disposed on the prism sheet and may serve to protect a surface of the prism sheet and diffuse light to achieve uniform light distribution.

The reflective sheet 430 may be disposed between the light guide plate 420 and the bottom chassis 440 and reflect light emitted downwards from the diffusion plate 420 to be directed toward the display panel 200, thereby improving light efficiency.

The reflective sheet 430 may include, for example, polyethylene terephthalate (PET), and thus may have reflectivity. One surface of the reflective sheet 430 may be coated with a diffusion layer including, for example, titanium dioxide.

In some embodiments, the reflective sheet 430 may be formed of a material containing metal, such as silver (Ag).

The bottom chassis 440 may accommodate the reflective sheet 430 and the light guide plate 420. A bottom portion 441 of the bottom chassis 440 may be parallel to the light guide plate 420. The bottom chassis 440 may include metal materials having rigidity, such as stainless steel, or materials having good heat dissipation properties, such as aluminum or an aluminum alloy. According to an exemplary embodiment, the bottom chassis 440 is responsible for maintaining a framework of the display device and protecting a variety of components accommodated therein.

The fixing member 460 may couple the bottom chassis 440 to the top chassis 100. Hereinafter, a coupling configuration of the bottom chassis 440 and the top chassis 100 using the fixing member 460 is described with reference to FIGS. 1 to 7.

Figure 3:
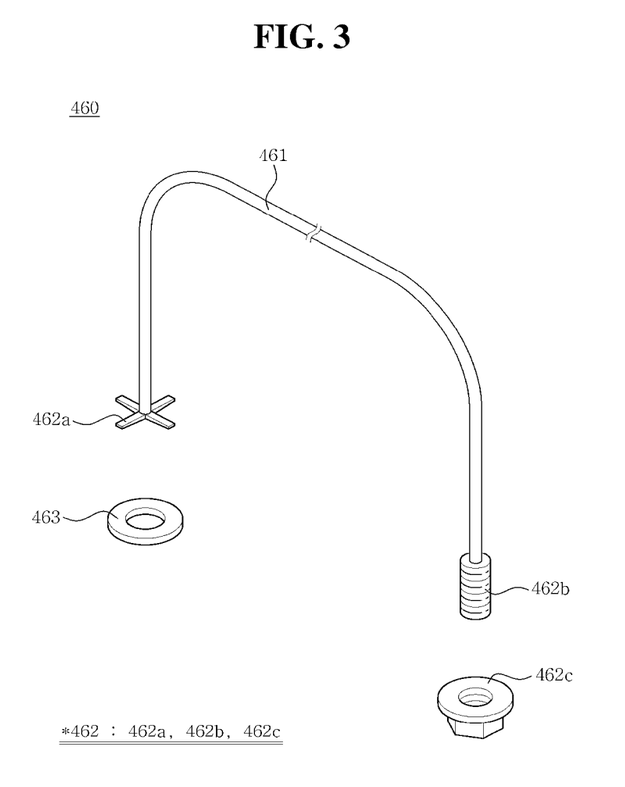
FIG. 3 is a schematic perspective view illustrating a fixing member of FIG. 1.
Figure 4:
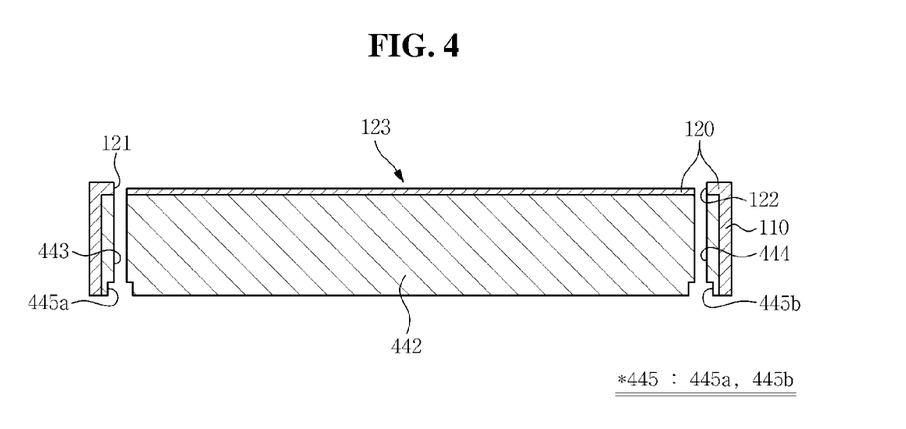
FIG. 4 is a cross-sectional view illustrating a top chassis and a bottom chassis taken along line B-B' of FIG. 1.
Figure 5:
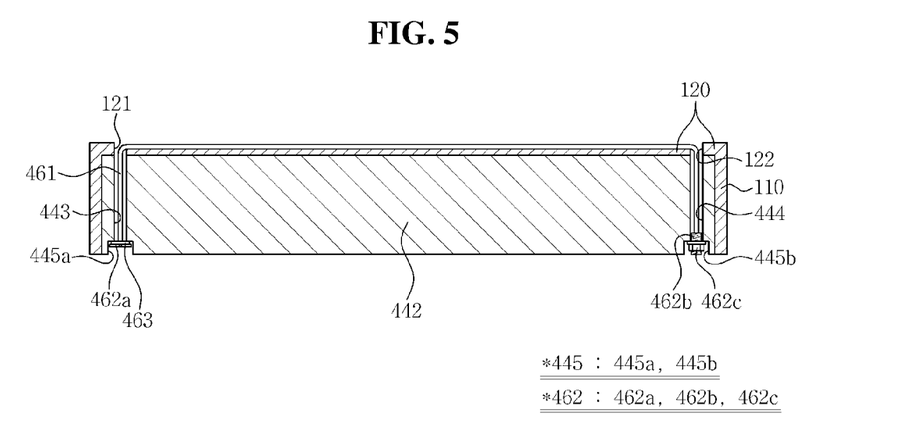
FIG. 5 is a cross-sectional view taken along line B-B' of FIG. 1.
Figure 6:
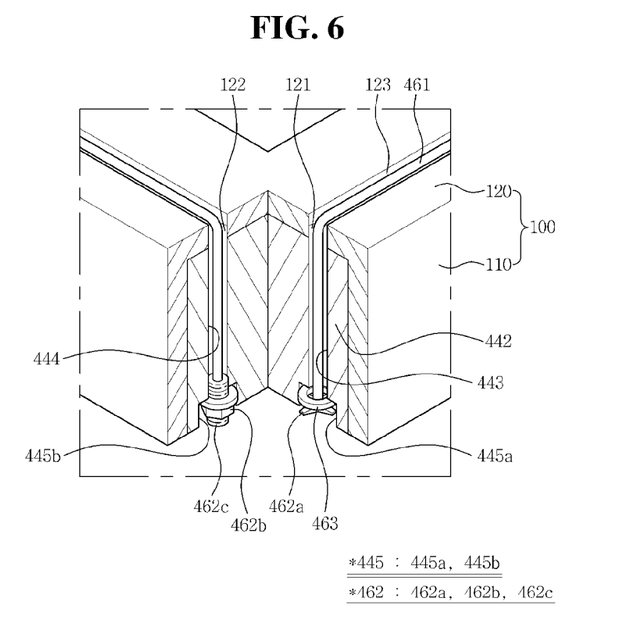
FIG. 6 is an enlarged partial view illustrating "C" portion of FIG. 1.
Figure 7:
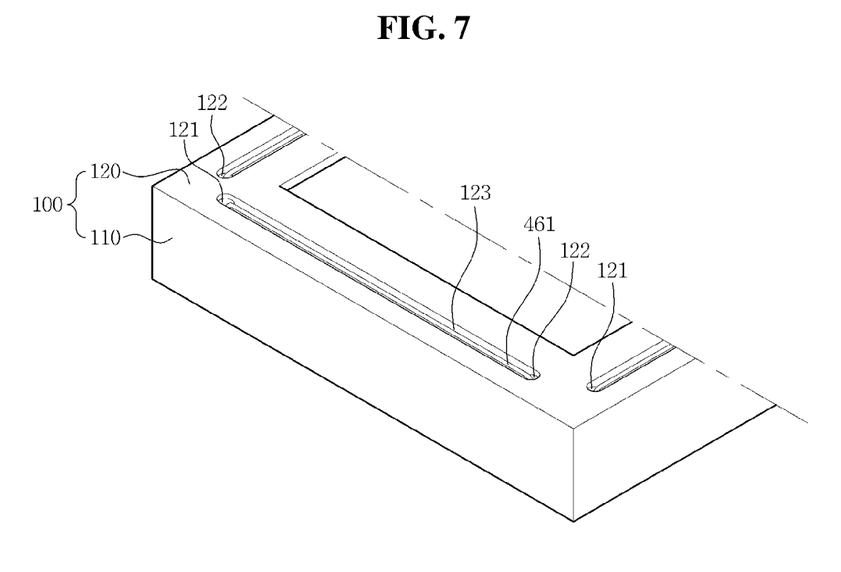
FIG. 7 is an enlarged partial view illustrating a top surface of the top chassis of FIG. 1.
Figure 8A:
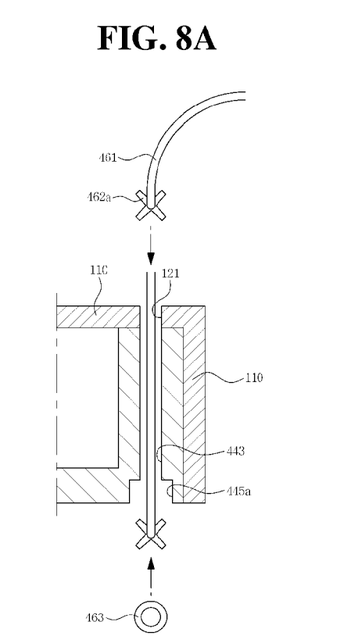
FIGS. 8A to 8D are schematic views illustrating a method of coupling a fixing member to a bottom chassis and a top chassis according to an exemplary embodiment.
Figure 8B:
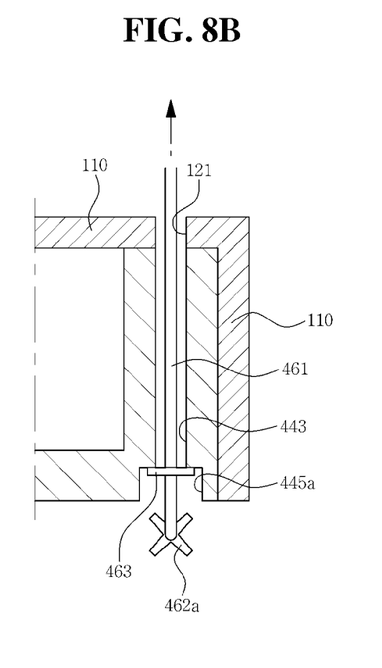
Figure 8C:
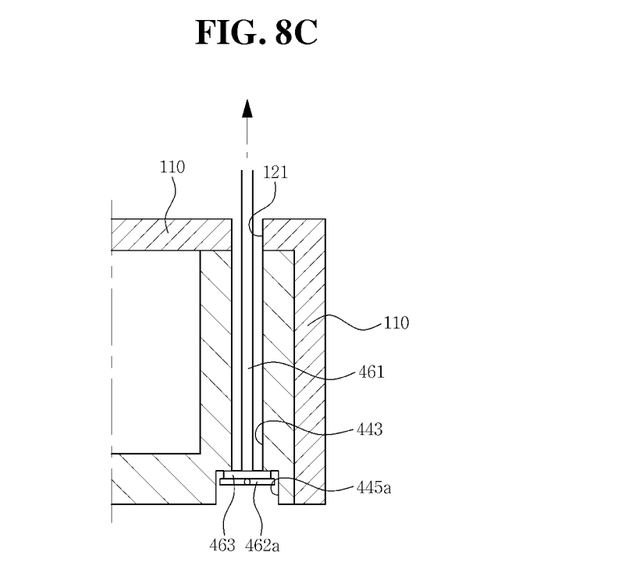
Figure 8D:
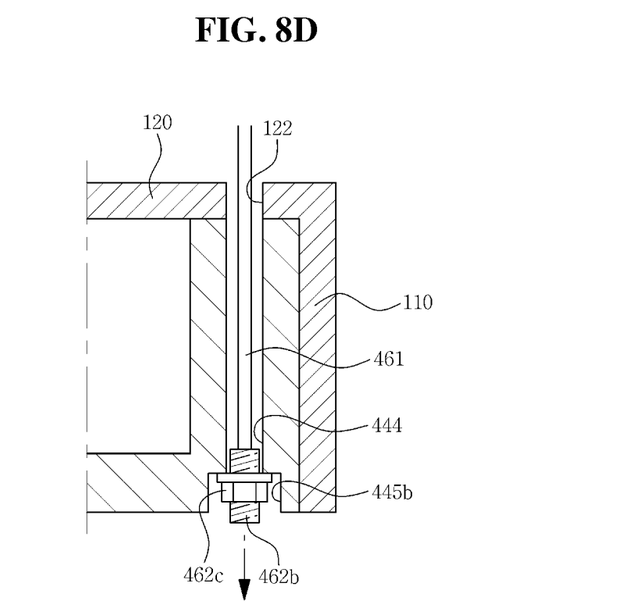

FIG. 3 is a schematic perspective view illustrating a fixing member of FIG. 1. FIG. 4 is a cross-sectional view illustrating a top chassis and a bottom chassis taken along line B-B' of FIG. 1. FIG. 5 is a cross-sectional view taken along line B-B' of FIG. 1. FIG. 6 is an enlarged partial view illustrating "C" portion of FIG. 1. FIG. 7 is an enlarged partial view illustrating a top surface of the top chassis of FIG. 1.

Referring to FIGS. 1, 2, and 4, the top chassis 100 may have a side surface portion 110 and a top surface portion 120 bent from the side surface portion 110. The top surface portion 120 may be respectively disposed at four corresponding sides of the display panel 200. In other words, the side portions 120 refer to one of the four sides of the top chassis 100 that surrounds the display panel 200.

The top chassis 100 may have first and second inserting holes 121 and 122. In some embodiments, the top chassis may have, as illustrated in FIG. 7, first and second inserting holes 121 and 122 at each corner thereof. The top surface portion 120 may respectively have first and second inserting holes 121 and 122 at one end portion and at another end portion. Further, the number of the first and second inserting holes 121 and 122 formed on the top chassis 100 may be increased in accordance with the size of the display device.

The bottom chassis 440 may have a bottom portion 441 and a side wall portion 442 bent from the bottom portion 441. The bottom chassis 440 may have third and fourth inserting holes 443 and 444. In detail, the side wall portion 442 may have the third inserting hole 443 at an area overlapping the first inserting hole 121 and have the fourth inserting hole 444 at an area overlapping the second inserting hole 122.

Referring to FIGS. 1, 2, and 3, at least one fixing member 460 may be employed to couple the bottom chassis 440 to the top chassis 100. The fixing members 460 may include a wire 461 and coupling units 462 respectively disposed at both end portions of the wire 461. The wire 461 extends through the top chassis 100 and the bottom chassis 440.

The coupling unit 462 may include a locking projection 462a disposed at one end portion of the wire 461 and locked at one of the bottom chassis 440 and the top chassis 100; and a bolt unit 462b disposed at another end portion of the wire 461 and having a screw groove. The coupling unit 462 may further include a nut unit 462c engaged with the bolt unit 462b. Meanwhile, the fixing member 460 may further include a washer 463.

Meanwhile, in some embodiments, the coupling unit 462 may respectively include only the bolt units 462b at one end portion and at another end portion of the wire 461, and may not include the locking projection 462a. In other words, the locking projection 462a may be replaced with a bolt and nut configuration.

The wire 461 may include metal materials that are bendable and the locking projection 462a may include a structure that is fordable. When unfolded, the locking projection 462a may have a size larger than a width (or diameter) of the third inserting hole 443. The washer 463 may have an aperture at a center portion and increase friction between the locking projection 462a and the third inserting hole 443.

The bolt unit 462b may have, as general bolts, an exterior screw groove. The exterior screw groove of the bolt unit 462b may be engaged with the nut unit 462c forming a screw connection. The nut unit 462c may include a nut to which the bolt unit 462b can be coupled. The nut unit 462c may have a size larger than a width of the fourth inserting hole 444.

At least one of the top chassis 100 and the bottom chassis 440 may have, at one surface thereof, a guide groove 123 on which the wire 461 is disposed. In some embodiments, the top chassis 100 may have a guide groove 123 on the top surface thereof, as shown in FIG. 2. In some embodiments, the bottom chassis 440 may have a guide groove 123 on a bottom surface thereof.

At least one of the top chassis 100 and the bottom chassis 440 may have, at another surface thereof, a mounting groove 445 in which the coupling unit 462 is disposed. In some embodiments, as illustrated in FIG. 4, the bottom chassis 440 may have a first mounting groove 445a under the third inserting hole 443 and may have a second mounting groove 445b under the fourth inserting hole 444.

The above-described coupling configuration of the top chassis 100 and the bottom chassis 440 using the fixing member 460 is described below in detail with reference to FIGS. 5 to 7.

The fixing member 460 may extend through the third inserting hole 443, the first inserting hole 121, the second inserting hole 122, and the fourth inserting hole 444, thereby coupling the bottom chassis 440 to the top chassis 100. The wire 461 may be disposed at the guide groove 123 formed at one surface of the top chassis 100. That is, the fixing member 460 may be disposed along the third inserting hole 443, the first inserting hole 121, the guide groove 123, the second inserting hole 122, and the fourth inserting hole 444. The guide groove 123 may limit position of the wire 461 and prevent detachment of the wire 461 from one surface of the top chassis 100.

Meanwhile, the locking projection 462a may be disposed at the first mounting groove 445a. The unfolded locking projection 462a has a size larger than the first mounting groove 445a, and thus may be brought into contact with the bottom chassis 440 due to tensile force of the wire 461. As illustrated in FIG. 5, the washer 463 may be further disposed in the first mounting groove 445a to achieve strong fixation of the locking projection 462a to the bottom chassis 440. The washer 463 may have an aperture at a center portion thereof and may be brought into contact with the locking projection 462a surrounding an outer side of the wire 461. The fixing member 460 can be fixed to the first mounting groove 445a only using the locking projection 462a without the washer 463.

The bolt unit 462b and the nut unit 462c may be disposed in the second inserting groove 445b. The nut unit 462c has a size larger than the size of the fourth inserting hole 444, and thus may be brought into contact with the bottom chassis 440 due to tensile force of the wire 461.

Meanwhile, the bolt unit 462b and the nut unit 462c may keep the wire 461 tensed, and adjust tensile force of the wire 461. Tensile force of the wire 461 may be adjusted by adjusting tightness of engagement between the bolt unit 462b and the nut unit 462c. In other words, the tensile force of the wire 461 may be increased in accordance with an increase in the tightness of engagement between the bolt unit 462b and the nut unit 462c. With the tensile force of the wire 461, the top chassis 100 and the bottom chassis 440 are brought into contact with each other.

As the fixing member 460 is disposed at the top chassis 100 and the bottom chassis 440 accordingly, coupling force between the top chassis 100 and the bottom chassis 440 is improved in a z-axis direction, and loosening of the top chassis 100 from the bottom chassis 440 can be prevented. Further, the coupling force between the top chassis 100 and the bottom chassis 440 may be adjusted by adjusting tightness of engagement between the bolt unit 462b and the nut unit 462c. As the hook or screw that couples the top chassis 100 to the bottom chassis 440 is replaced with the fixing member 460, coupling configuration of the top chassis 100 and the bottom chassis 440 may be simplified and assembly allowance may be minimized.

Meanwhile, the first to fourth inserting holes 121, 122, 443, and 444 may have a diameter larger than that of the wire 461.

Further, the number of the first to fourth inserting holes 121, 122, 443, and 444, the mounting groove 445, and the fixing member 460 illustrated in FIGS. 1 to 7 is not limited to the above description and may vary in consideration of coupling force and the size of the display device.

In contrast, in some embodiments, the bottom chassis 440 may have the guide groove 123 as described above. In this case, the top chassis 100 may have the mounting groove 445. The wire 461 may be disposed at the guide groove 123 formed at the bottom surface of the bottom chassis 440 and the coupling unit 462 may be disposed at the mounting groove 445 formed at the top chassis 100. Accordingly, the fixing member 460 may have a configuration that is the same as that illustrated in FIG. 5 but is rotated by 180 degrees, and disposed at the top chassis 100 and the bottom chassis 440.

Hereinafter, an order of installing the fixing member 460 to the top chassis 100 and to the bottom chassis 440 is described with reference to FIGS. 8A to 8D.

FIGS. 8A to 8D are schematic views illustrating a method of installing a fixing member to a bottom chassis and a top chassis according to an exemplary embodiment.

Referring to FIGS. 8A to 8D, a locking projection 462a connected to one end portion of a wire 461 may be inserted to the first and third inserting holes 121 and 443 in a folded state, and the wire 461 may be inserted to the first and third inserting holes 121 and 443 along the locking projection 462a. After passing through the third inserting hole 443, the locking projection 462a may pass through an aperture of a washer 463 and become unfolded. As the wire 461 is pulled toward a top surface of the top chassis 100, the unfolded locking projection 462a and the washer 463 may be brought into contact with each other in the first mounting groove 445a, and are fixed to the bottom chassis 440. The wire 461 may be mounted on a guide groove 123, and a bolt unit 462b connected to another end portion of the wire 461 may be inserted to the second and fourth inserting holes 122 and 444. The bolt unit 462b inserted to the second mounting groove 445b is engaged with the nut unit 462c. As the bolt unit 462b is tightly engaged with the nut unit 462c, the loose wire 461 may be tightened to maintain a tensed state. In other words, as the bolt unit 462b is engaged with the nut unit 462c, tensile force may be generated in the wire 461. The generated tensile force of the wire 461 may strongly couple the top chassis 100 to the bottom chassis 440.

Hereinafter, another exemplary embodiment will be described with reference to FIGS. 9 to 11. The same descriptions repeated according to an exemplary embodiment will be omitted for conciseness.

Figure 9:
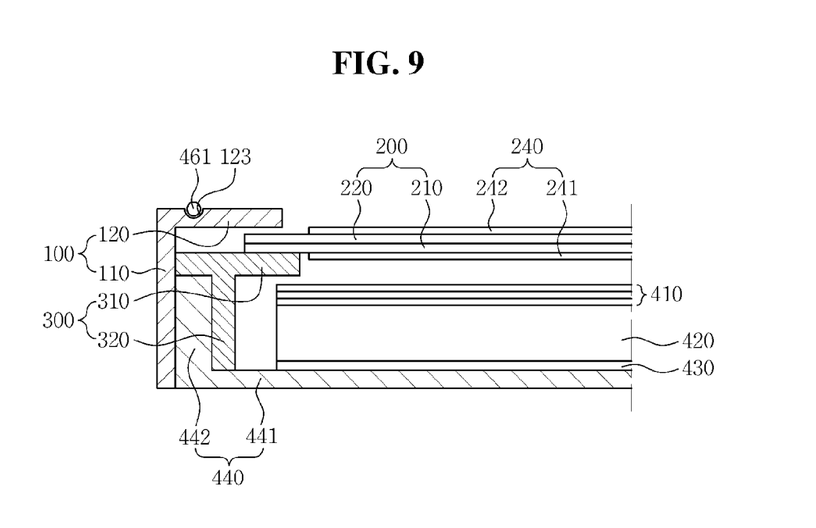
FIG. 9 is a schematic cross-sectional view illustrating a display device according to another exemplary embodiment.

FIG. 9 is a schematic cross-sectional view illustrating a display device according to another exemplary embodiment.

Figure 10:
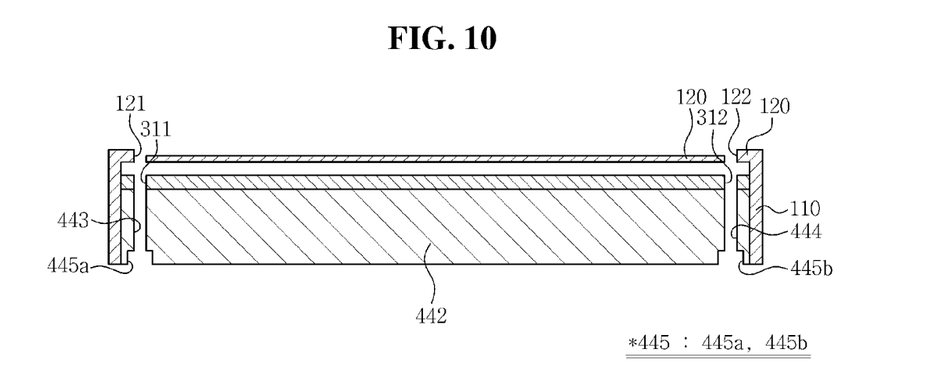
FIG. 10 is a schematic cross-sectional view illustrating a bottom chassis, a mold frame, and a top chassis of FIG. 9.

FIG. 10 is a schematic cross-sectional view illustrating a bottom chassis, a mold frame, and a top chassis of FIG. 9.

Figure 11:
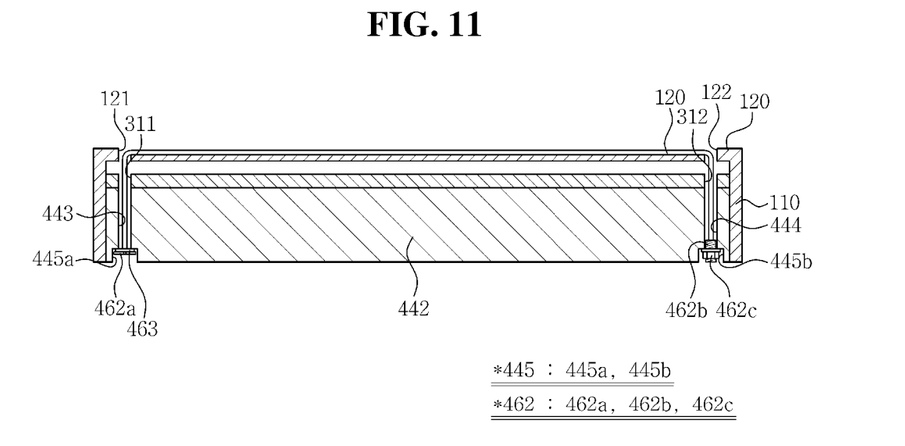
FIG. 11 is a schematic cross-sectional view illustrating a fixing member, the bottom chassis, the mold frame, and the top chassis of FIG. 9.

FIG. 11 is a schematic cross-sectional view illustrating a fixing member, the bottom chassis, the mold frame, and the top chassis of FIG. 9.

Referring to FIGS. 9 to 11, the mold frame 300 may include a support 310 on which a display panel 200 is disposed, and a protrusion 320. The support 310 may have fifth and sixth inserting holes 311 and 312. In detail, the support 310 may have the fifth inserting hole 311 at an area overlapping the first and third inserting holes 121 and 443, and may have the sixth inserting hole 312 at an area overlapping the second and fourth inserting holes 122 and 444.

Accordingly, the fixing member 460 may extend through the third inserting hole 443, the fifth inserting hole 311, the first inserting hole 121, the second inserting hole 122, the sixth inserting hole 312, and the fourth inserting hole 444 to thereby couple the top chassis 100, the mold frame 300, and the bottom chassis 440 together.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. Various features of the above described and other embodiments can be mixed and matched in any manner, to produce further embodiments consistent with the invention.

What is claimed is:

1. A display device comprising:
    a display panel;
    a top chassis including a top surface portion that is configured to partially cover a top surface of the display panel, the top chassis having first and second inserting holes, each of the first and second inserting holes formed inside a body of the top chassis and completely perforating the body of the top chassis;
    a bottom chassis configured to accommodate the display panel and having third and fourth inserting holes corresponding to first and second inserting holes respectively, the bottom chassis including a bottom portion, the display panel disposed between the top surface portion of the top chassis and the bottom portion of the bottom chassis; and
    at least one fixing member extending through each of the third inserting hole, the first inserting hole, the second inserting hole, and the fourth inserting hole to thereby couple the bottom chassis to the top chassis, wherein the fixing member is disposed on a guide groove positioned on at least one of the top surface portion of the top chassis and the bottom portion of the bottom chassis, wherein the guide groove extends along a major length of the top surface portion of the top chassis.

2. The display device of claim 1, wherein the fixing member comprises:
    a wire; and
    coupling units disposed at both end portions of the wire extending through the top chassis and the bottom chassis.

3. The display device of claim 2, wherein the coupling unit comprises: a locking projection disposed at one end portion of the wire and locked to one of the bottom chassis and the top chassis; and a bolt unit extending from another end portion of the wire and having a screw groove.

4. The display device of claim 3, wherein the coupling unit further comprises a nut unit engaged with the bolt unit.

5. The display device of claim 1, wherein the guide groove is continuously connected to the first and second inserting holes.

6. The display device of claim 5, wherein a mounting groove is formed on a surface of at least another of the top chassis and the bottom chassis, one of the the coupling units being disposed in the mounting groove.

7. The display device of claim 1, wherein the bottom chassis has a bottom portion and a side wall portion bent from the bottom portion.

8. The display device of claim 7, wherein the side wall portion has the third inserting hole and the fourth inserting hole.

9. The display device of claim 1, further comprising a mold frame coupled to the bottom chassis.

10. The display device of claim 9, wherein the mold frame comprises a support on which the display panel is disposed, the support having fifth and sixth inserting holes.

11. The display device of claim 10, wherein the fixing member extends through the third inserting hole, the fifth inserting hole, the first inserting hole, the second inserting hole, the sixth inserting hole, and the fourth inserting hole to couple the bottom chassis, the top chassis, and the mold frame together.

12. The display device of claim 1, wherein the fixing member contacts each of the top chassis and the bottom chassis.

13. The display device of claim 1, wherein first and second inserting holes are disposed at each corner of the top chassis.

14. The display device of claim 1, wherein each of the third and fourth inserting holes completely perforates the body of the bottom chassis.

* * * * *